(12) United States Patent
Chen et al.

(10) Patent No.: US 11,461,989 B2
(45) Date of Patent: Oct. 4, 2022

(54) MONITOR METHOD AND MONITOR SYSTEM THEREOF WHEREIN MASK IS USED TO COVER IMAGE FOR DETECTING OBJECT

(71) Applicant: HIMAX TECHNOLOGIES LIMITED, Tainan (TW)

(72) Inventors: Pin-Rong Chen, Tainan (TW); Ti-Wen Tang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 90 days.

(21) Appl. No.: 17/111,515

(22) Filed: Dec. 4, 2020

(65) Prior Publication Data
US 2022/0180112 A1 Jun. 9, 2022

(51) Int. Cl.
*G06V 10/22* (2022.01)
*H04N 7/18* (2006.01)
*G06N 3/08* (2006.01)
*G06N 3/04* (2006.01)
*G06V 20/52* (2022.01)
*G06V 40/10* (2022.01)

(52) U.S. Cl.
CPC .............. *G06V 10/22* (2022.01); *G06N 3/04* (2013.01); *G06N 3/08* (2013.01); *G06V 20/52* (2022.01); *G06V 40/103* (2022.01); *H04N 7/18* (2013.01)

(58) Field of Classification Search
CPC ........ G06V 20/52; G06V 40/103; G06N 3/04; G06N 3/08; H04N 7/18
See application file for complete search history.

(56) References Cited

U.S. PATENT DOCUMENTS

| 9,547,908 | B1 * | 1/2017 | Kim | G06V 40/162 |
| 9,864,901 | B2 * | 1/2018 | Chang | G06K 9/627 |
| 10,867,190 | B1 * | 12/2020 | Vajna | G06V 20/64 |
| 10,902,291 | B1 * | 1/2021 | Kim | G06V 10/764 |
| 2009/0175411 | A1 * | 7/2009 | Gudmundson | G01V 5/0083 378/57 |
| 2017/0332198 | A1 * | 11/2017 | Dannenbring | G01C 21/32 |
| 2017/0358094 | A1 * | 12/2017 | Sun | G06T 7/11 |
| 2018/0322371 | A1 * | 11/2018 | Dupont De Dinechin | G06N 20/10 |

(Continued)

FOREIGN PATENT DOCUMENTS

| TW | 201308254 A1 | 2/2013 |
| TW | 202036091 A | 10/2020 |
| TW | 202038188 A | 10/2020 |

OTHER PUBLICATIONS

Wang G, Xiong Z, Liu D, Luo C. Cascade mask generation framework for fast small object detection. In2018 IEEE International Conference on Multimedia and Expo (ICME) Jul. 23, 2018 (pp. 1-6). IEEE. (Year: 2018).*

(Continued)

*Primary Examiner* — Michelle M Entezari
(74) *Attorney, Agent, or Firm* — Winston Hsu

(57) ABSTRACT

A monitor method for detecting an object includes capturing an image; calculating an initial probability of the object existing in the image; applying a mask to cover a first portion of the image if the initial probability is higher than a threshold; calculating a first probability of the object existing in the image excluding the first portion; and using at least the first probability to detect the location the object in the image.

17 Claims, 8 Drawing Sheets

(56) References Cited

U.S. PATENT DOCUMENTS

| | | | |
|---|---|---|---|
| 2019/0171871 A1* | 6/2019 | Zhang | G06T 7/75 |
| 2019/0213443 A1* | 7/2019 | Cunningham | G06K 9/6256 |
| 2019/0286932 A1* | 9/2019 | Du | G06V 20/00 |
| 2020/0193732 A1* | 6/2020 | Nagarathinam | G08G 1/0175 |
| 2020/0349711 A1 | 11/2020 | Duke | |
| 2021/0319242 A1* | 10/2021 | Cholakkal | G06N 3/08 |
| 2021/0319560 A1 | 10/2021 | Xia | |
| 2021/0365732 A1* | 11/2021 | Lin | G06V 10/267 |
| 2022/0036573 A1* | 2/2022 | Kim | G06T 7/50 |

OTHER PUBLICATIONS

Ding H, Qiao S, Yuille A, Shen W. Deeply shape-guided cascade for instance segmentation. InProceedings of the IEEE/CVF Conference on Computer Vision and Pattern Recognition 2021 (pp. 8278-8288). (Year: 2021).*

Zhang L, Zhang J, Lin Z, Lu H, He Y. Capsal: Leveraging captioning to boost semantics for salient object detection. InProceedings of the IEEE/CVF Conference on Computer Vision and Pattern Recognition 2019 (pp. 6024-6033). (Year: 2019).*

Li C, Yang T, Zhu S, Chen C, Guan S. Density map guided object detection in aerial images. Inproceedings of the IEEE/CVF conference on computer vision and pattern recognition workshops 2020 (pp. 190-191). (Year: 2020).*

Han M, Xu W, Tao H, Gong Y. An algorithm for multiple object trajectory tracking. InProceedings of the 2004 IEEE Computer Society Conference on Computer Vision and Pattern Recognition, 2004. CVPR 2004. Jun. 27, 2004 (vol. 1, pp. I-I). IEEE. (Year: 2004).*

Ammirato, Phil, and Alexander C. Berg. "A mask-rcnn baseline for probabilistic object detection." arXiv preprint arXiv:1908.03621 (2019). (Year: 2019).*

Hall D, Dayoub F, Skinner J, Zhang H, Miller D, Corke P. Carneiro G, Angelova A, Sunderhauf N. Probabilistic object detection: Definition and evaluation. InProceedings of the IEEE/CVF Winter Conference on Applications of Computer Vision 2020 (pp. 1031-1040). (Year: 2020).*

* cited by examiner

MONITOR METHOD AND MONITOR SYSTEM THEREOF WHEREIN MASK IS USED TO COVER IMAGE FOR DETECTING OBJECT

BACKGROUND OF THE INVENTION

1. Field of the Invention

The disclosure is related to a monitor method and a monitor device thereof, and more particularly, a monitor method and a monitor device thereof where a mask is used to cover an image for detecting an object.

2. Description of the Prior Art

With the increasing demand for security surveillance, the demand for analyzing monitor images has also increased. For example, a surveillance camera operated 24 hours a day can generate videos 8760 hours a year, and there may be hundreds of surveillance cameras in a building. Hence, the human resource for monitoring and even analyzing the videos and images can be overwhelming. Presently, a lot of manpower is used to monitor the screens or images for assuring the security. However, this will lead to higher cost and human error because the attention of security practitioners is limited. In the field, an automatic solution taking reasonable resource for analyzing the images captured by cameras is in shortage.

SUMMARY OF THE INVENTION

An embodiment provides a monitor method for detecting an object including capturing an image; calculating an initial probability of the object existing in the image; applying a mask to cover a first portion of the image if the initial probability is higher than a threshold; calculating a first probability of the object existing in the image excluding the first portion; and using at least the first probability to detect the location the object in the image.

Another embodiment provides a monitor system for detecting an object, including a surveillance camera configured to capture an image; and a processor configured to apply a mask to cover a first portion of the image, calculate a first probability of the object existing in the image excluding the first portion, and use at least the first probability to detect the object in the image.

These and other objectives of the present invention will no doubt become obvious to those of ordinary skill in the art after reading the following detailed description of the preferred embodiment that is illustrated in the various figures and drawings.

DETAILED DESCRIPTION

In order to deal with the problem mentioned above, a monitor method and a monitor device can be provided according to embodiments to analyze the images of a monitored space.

Figure 1:
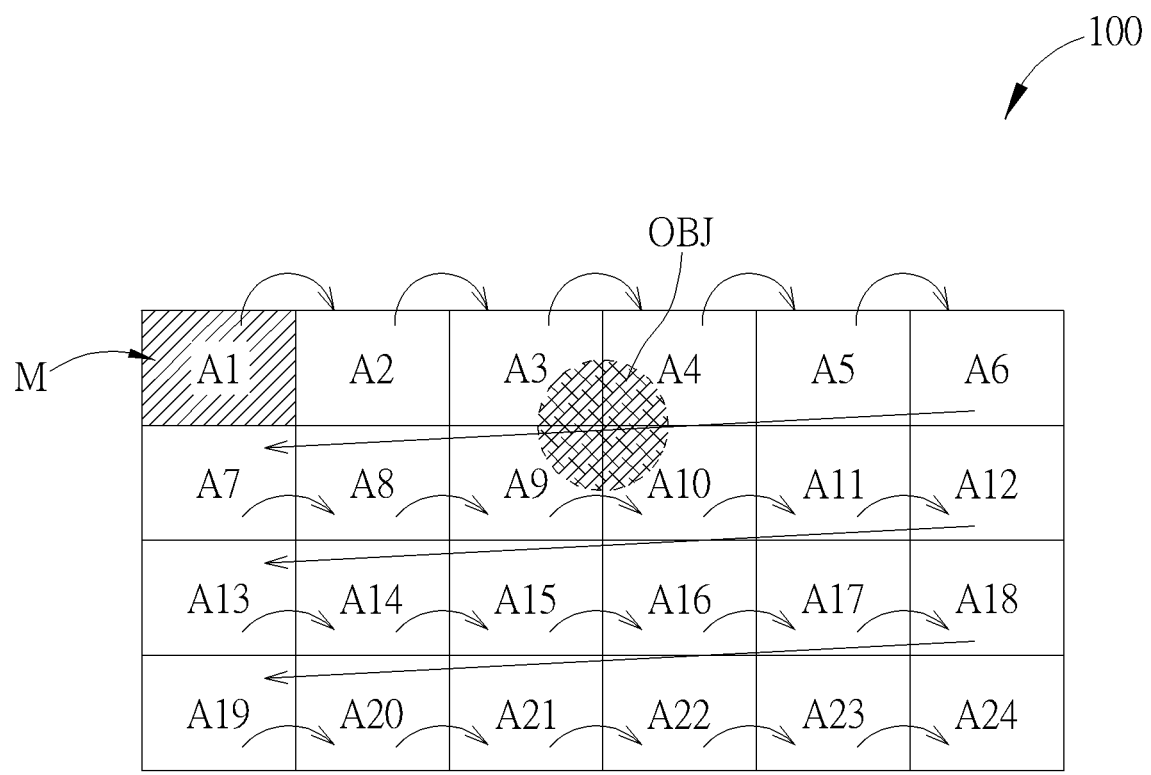
FIG. 1 illustrates an image including an object to be detected.
Figure 2:
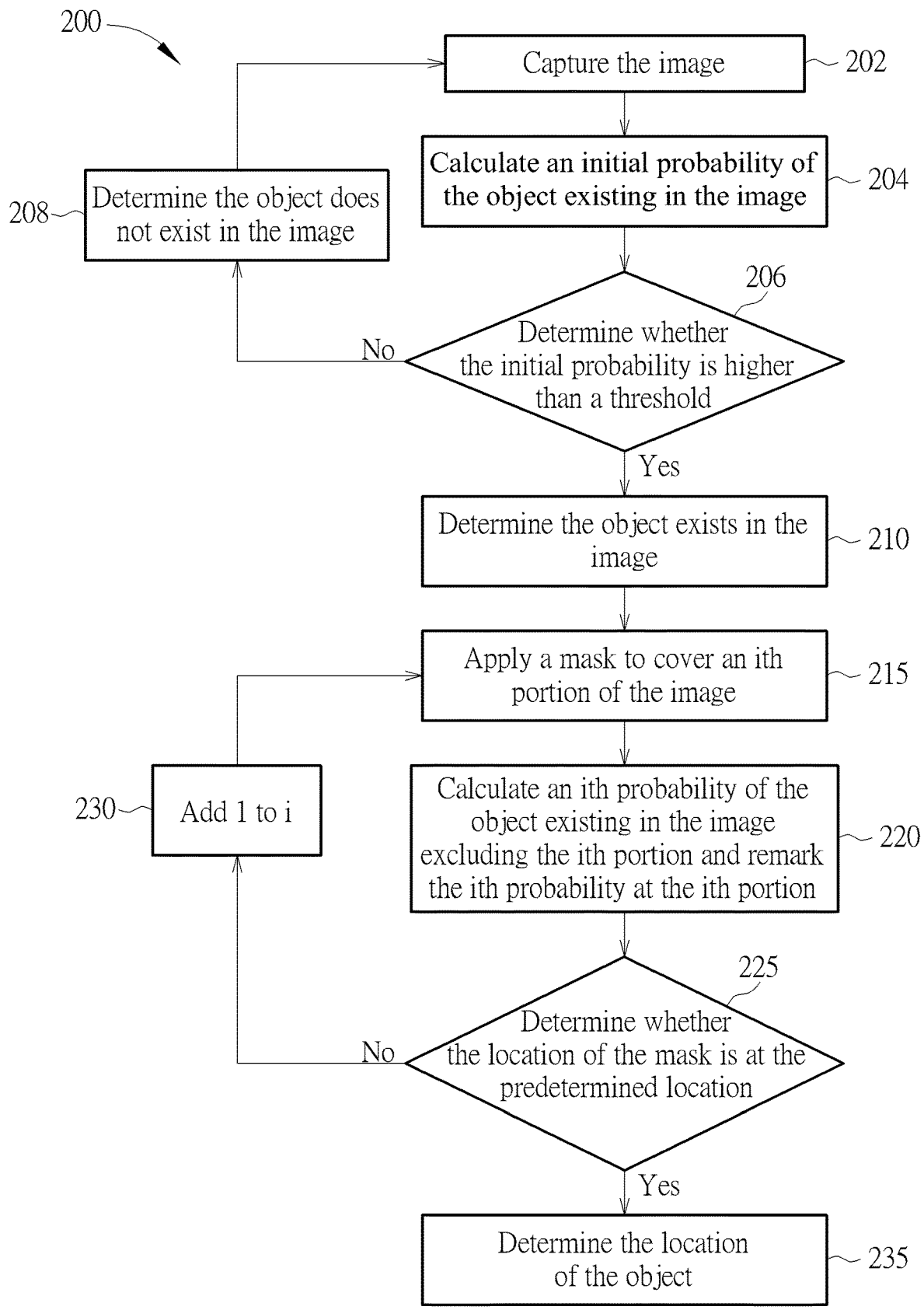
FIG. 2 is a flowchart of a monitor method according to an embodiment.
Figure 3:
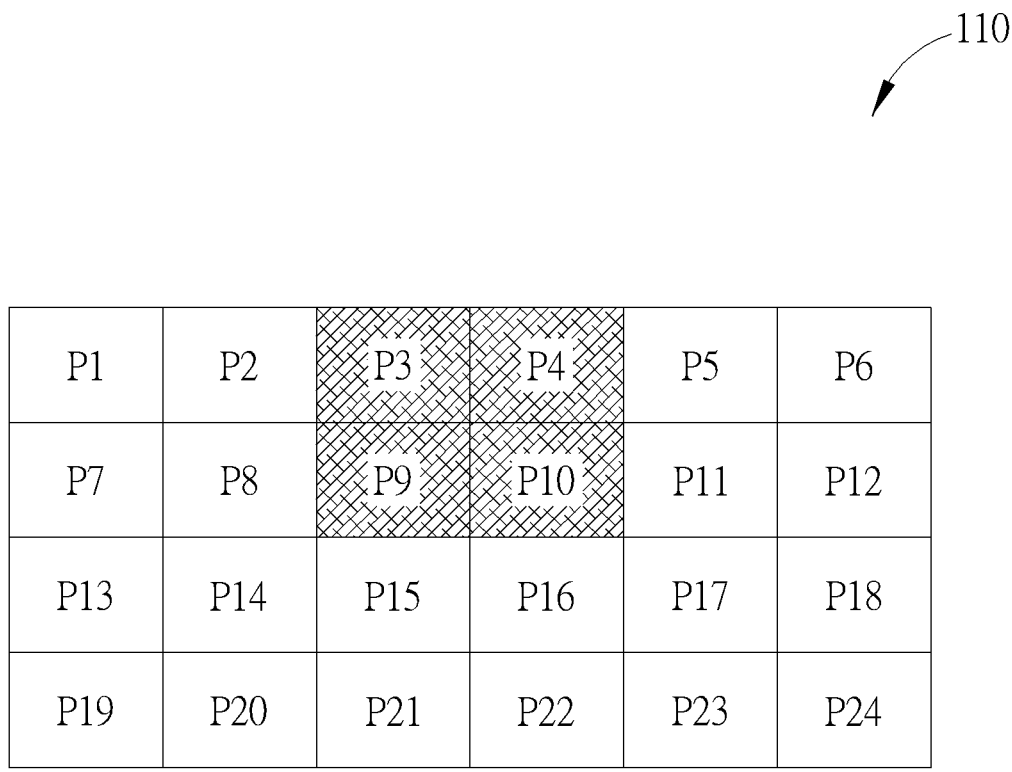
FIG. 3 illustrates a processed image obtained by processing the image of FIG. 1 by means of the monitor method of FIG. 2.

FIG. 1 illustrates an image 100 including an object OBJ to be detected. FIG. 2 is a flowchart of a monitor method 200 according to an embodiment. FIG. 3 illustrates a processed image 110 obtained by processing the image 100 of FIG. 1 by means of the monitor method 200. FIG. 1 and FIG. 3 are merely of an example instead of limiting the scope of embodiments. By means of the monitor method 200, the image 100 can be processed to generate a processed image 110.

The object OBJ can be a person or a predetermined object. For example, the image 100 can be an image of an office, and the purpose of security surveillance can be monitoring whether any person exists at an abnormal time (e.g., weekend or midnight) or whether any person abnormally appears in a restricted area (e.g., an area close to a vault). In order to detect the existence and/or the location of the object OBJ, the monitor method 200 can be used. The monitor method 200 can include the following steps.

Step 202: capture the image 100;

Step 204: calculate an initial probability PO of the object OBJ existing in the image 100;

Step 206: determine whether the initial probability PO is higher than a threshold; if so, enter Step 210; else enter Step 208;

Step 208: determine the object OBJ does not exist in the image 100; enter Step 202;

Step 210: determine the object OBJ exists in the image 100;

Step 215: apply a mask M to cover an ith portion Ai of the image 100;

Step 220: calculate an ith probability Pi of the object OBJ existing in the image 100 excluding the ith portion Ai and remark the ith probability Pi at the portion Ai;

Step 225: determine whether the location of the mask M is at the predetermined location; if so, enter Step 235; else enter Step 230;

Step 230: add 1 to i; enter Step 215; and

Step 235: determine the location of the object OBJ.

In Step 202 to Step 210, an initial classification can be performed to determine whether the object OBJ (e.g., a person or a specific object) exists. In Step 204 and Step 206, a machine learning model such as a convolutional neural network (CNN) model can be used, and the determination made by the model can be more and more accurate by training to adjust the weights used for calculation.

The threshold mentioned in Step 206 may be, for example, 90% or an appropriate threshold obtained by experiment and calculation such as the result of machine learning. Only if the object OBJ is determined to exist, Step 215 to Step 235 can be performed to determine the location of the object OBJ.

In Step 215 to Step 235, the mask M can be moved to cover different portions of the image 100 to obtain the probabilities corresponding to different portions, and the probabilities can be remarked at different portions of the image 110. The location of the object OBJ can be accordingly determined.

In Step 215 to Step 235, the mask M can cover an ith portion Ai of the image 100. Here, the variable i can be an integer larger than zero. The mask M can have a predetermined dimension such as m pixel(s)×n pixel(s), where m and n can be integers larger than zero. When the ith mask is applied to cover the portion Ai, there can be one of the three scenarios said below.

(Scenario-i)

If the mask M fails to cover any part of the object OBJ in the image 100, the ith probability Pi of the object OBJ existing in the image 100 excluding the ith portion Ai in Step 220 can be as high as the initial probability P0 said in Step 204.

(Scenario-ii)

If the mask M covers a part of the object OBJ in the image 100, the ith probability Pi of the object OBJ existing in the image 100 excluding the ith portion Ai in Step 220 can be a value lower than the initial probability P0 said in Step 204.

(Scenario-iii)

If the mask M covers all of the object OBJ in the image 100, the ith probability Pi of the object OBJ existing in the image 100 excluding the ith portion Ai in Step 220 can be a lowest value (for example, zero).

When a plurality of portions (e.g., A1, A2, A3 . . . ) of the image 100 are covered in sequence, the obtained probabilities (e.g., P1, P2, P3 . . . ) can be respectively remarked to the portions to generate the processed image 110, and the location of the object OBJ can be determined by means of the processed image 110. Below, FIG. 1 and FIG. 3 can be an example to describe the method 200.

In FIG. 1, the mask M can be shifted to sequentially cover the portions A1, A2, A3 . . . A24 to obtain the probabilities P1, P2, P3 . . . P24. By remarking the probabilities P1, P2, P3 . . . P24 to the portions A1, A2, A3 . . . A24, the processed image 110 of FIG. 3 can be obtained. In the example of FIG. 3, the probabilities P3, P4, P9 and P10 (remarked at the portions A3, A4, A9 and A10 of the image 100) are relatively lower than other probabilities because when the mask M covers the portions A3, A4, A9 and A10, a part of the object OBJ is covered as the scenario-ii mentioned above. Hence, in Step 235, the location of the object OBJ can be determined to be at the portions A3, A4, A9 and A10 of the image 100 by reviewing all probabilities in FIG. 3. The arrows in FIG. 1 are used to indicate the shift of the mask M.

Regarding Step 225, if the location of the mask M is NOT at the predetermined location, the mask M can be moved to cover a subsequent portion of the image 100, and the location of the covered portion of the image 100 can be adjusted regularly each time. The predetermined location said in Step 225 can be a predefined final location. If the location of the mask M is at the predetermined location, the mask M may not be moved to cover a subsequent portion of the image 100.

For example, in FIG. 1 and FIG. 3, the portion A1 being firstly covered by the mask M can be at the upper left corner of the image 100. Then, the mask M can be moved to the right to cover the portion A2. So on and so forth, the mask M can be move to the right to sequentially cover the portions A3, A4, A5 and A6. Since the portion A6 is at the upper right corner of the image 100, after covering the portion A6 to obtain the probability P6, the mask can be moved to cover the portion A7 below the portion A1. Likewise, the mask M can be continuously shifted to calculate the probabilities corresponding to different portions of the image 100 until the mask M is moved to the predetermined location said in Step 225. For example, in FIG. 1 and FIG. 3, the predetermined location said in Step 225 can be at the portion A24 at the lower right corner of the image 100.

Figure 4:
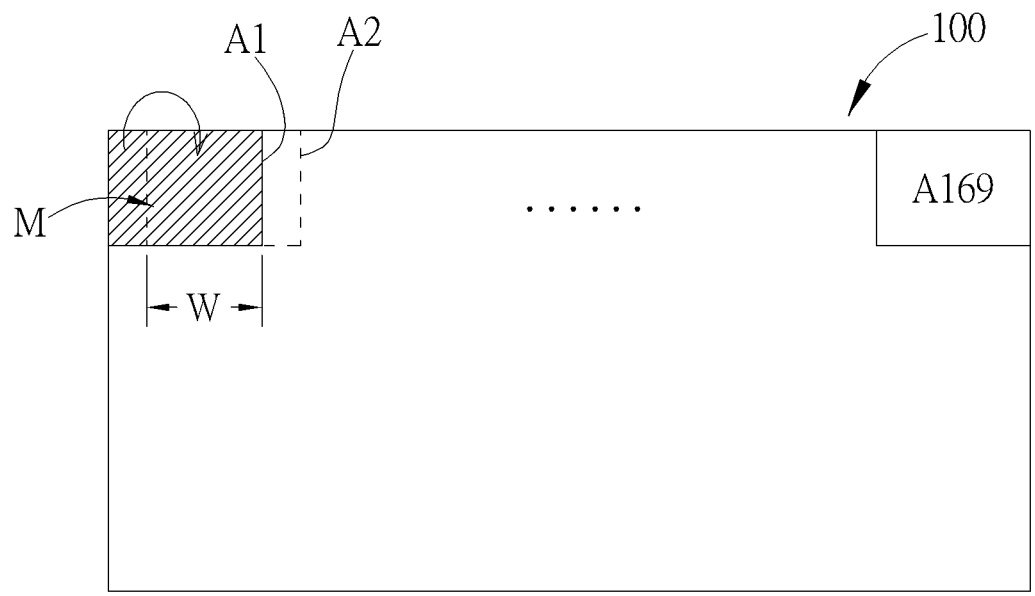
FIG. 4 illustrates an example where a portion and a subsequent portion covered by the mask partially overlap with one another.

In FIG. 1 and FIG. 3, a portion and a subsequent portion covered by the mask M are adjacent with one another and not overlapped with one another; however, this is merely an example instead of limiting the scope of embodiments. According to other embodiments, a portion and a subsequent portion covered by the mask M can partially overlap with one another as shown in FIG. 4.

For example, if the width of the image 100 said in Step 202 includes 192 pixels, the width of the mask M is 24 pixels, and a portion (e.g. A1) and a subsequent portion (e.g. A2) being sequentially masked have an overlap width of 23 pixels, the mask M can be horizontally moved for 168 (i.e. 192-24) times from a leftmost portion (e.g. A1) to a rightmost portion (e.g. A169) of the image 100 to cover 169 portions for calculating 169 probabilities of the object OBJ existing in the upper section of image 100. In other words, the mask M can be moved by 1 pixel each time. By overlapping a portion with a subsequent portion covered by the mask M, the resolution of detecting the object OBJ can be effectively increased; however, the amount of calculation is also increased, and more computing resources are needed.

Figure 5:
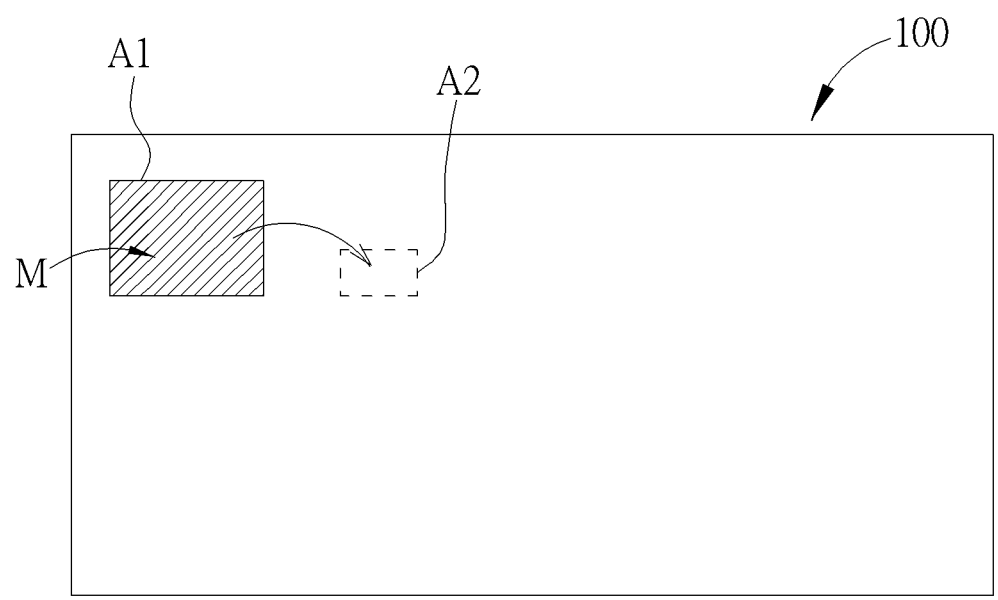
FIG. 5 illustrates an example where the dimension of the mask is adjusted.
Figure 6:
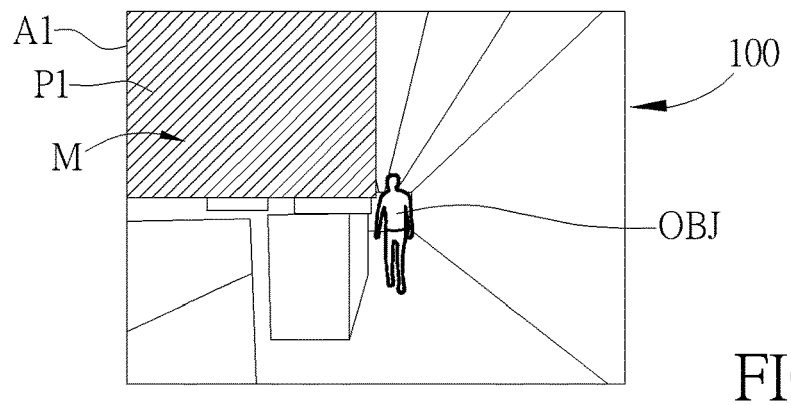
FIG. 6 to FIG. 9 illustrate an example where the mask respectively covers the portions of the image.
Figure 7:
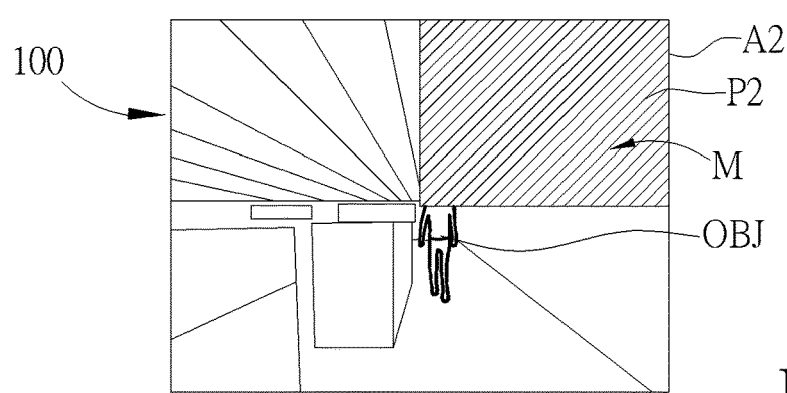
Figure 8:
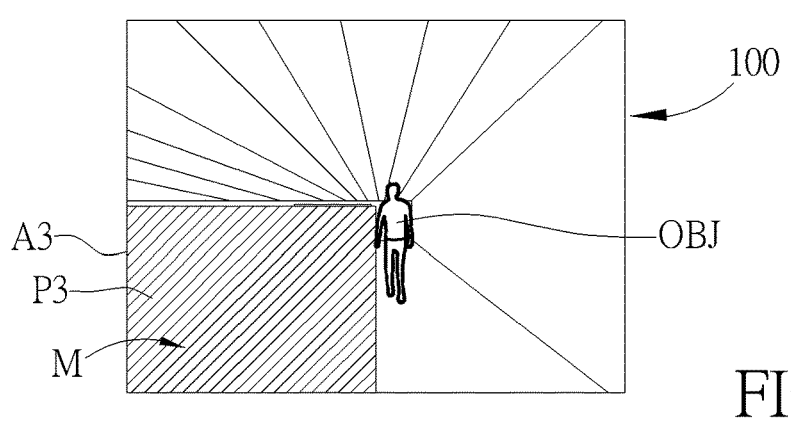

According to embodiments, the dimension of the mask M can be adjusted so that the dimension of the portion can be different from the dimension of the subsequent portion covered by the mask M. For example, as shown in FIG. 5, the dimension of the portion A2 can be different from the dimension of the preceding portion A1, where the dimension of mask M is shrunk after being moved from the portion A1 to the portion A2. FIG. 5 is merely an example, according to requirements, the mask M can be enlarged for calculating the probability.

According to embodiments, the mask M can cover a first portion of the image 100, and cover a second portion of the image 100 afterward when Step 215 is performed for another time, where the first portion can be inside the second portion. In this manner, the resolution of detecting the object OBJ can hence be further improved. An example is described below.

FIG. 6 to FIG. 9 illustrate the mask M respectively covers the portions A1 to A4 of the image 100 in an example. In the example, the image 100 can be a picture of an office, and the objected OBJ to be detected can be a person. The portions A1, A2, A3 and A4 can be at the upper left portion, upper right portion, lower left portion, and lower right portion of the image 100. In this example, the portions A1 to A4 do not overlap with one another. As mentioned in Step 215 and Step 220, four probabilities P1, P2, P3 and P4 of the object OBJ existing in the image 100 excluding the covered portions can be calculated, and the probabilities P1, P2, P3 and P4 can be respectively remarked to the portions A1 to A4.

Figure 9:
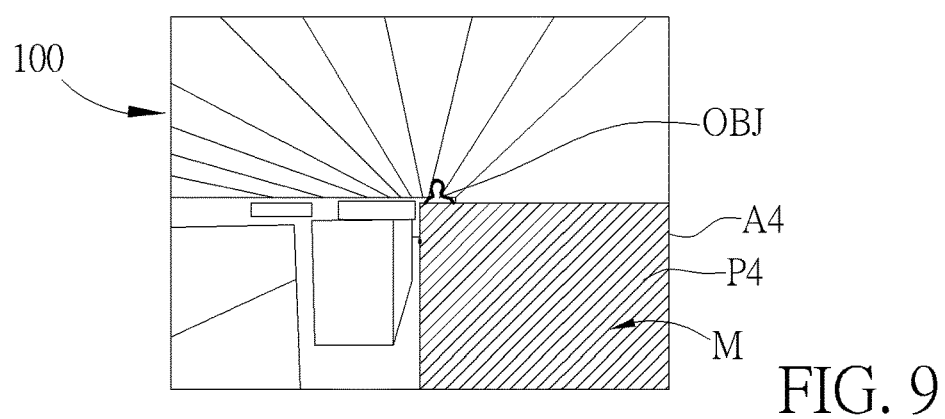
Figure 10:
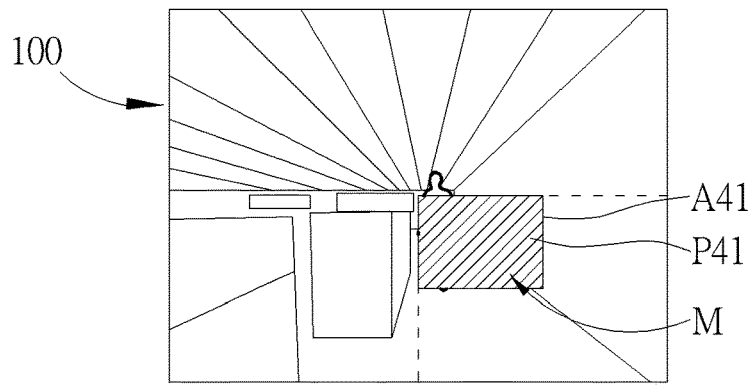
FIG. 10 to FIG. 13 illustrate an example where the mask is moved to sequentially cover sub-portions in the selected portion of FIG. 6 to FIG. 9.
Figure 11:
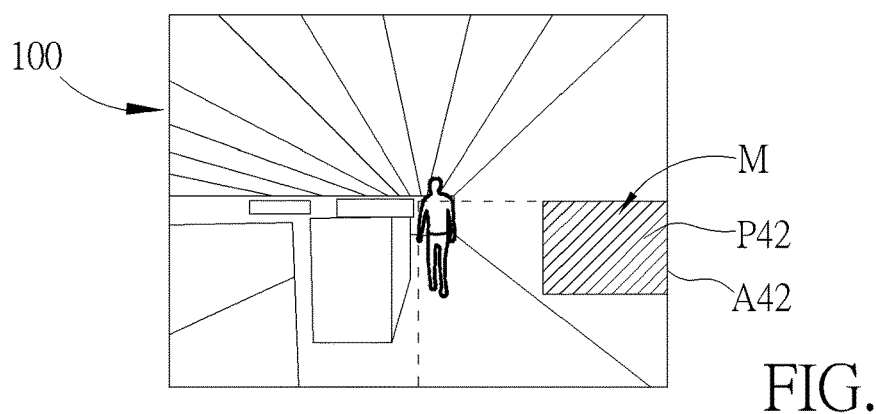
Figure 12:
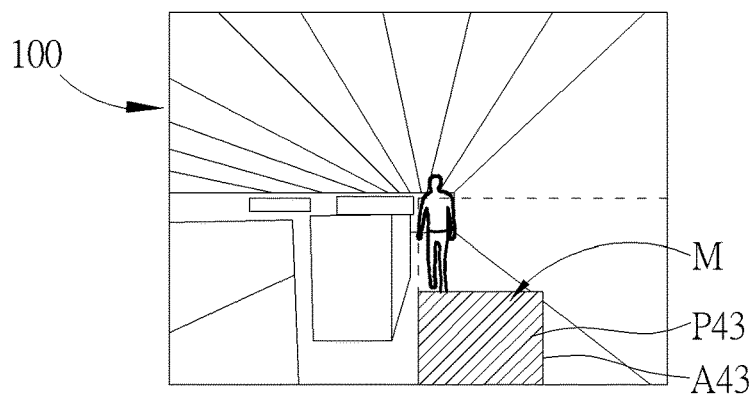
Figure 13:
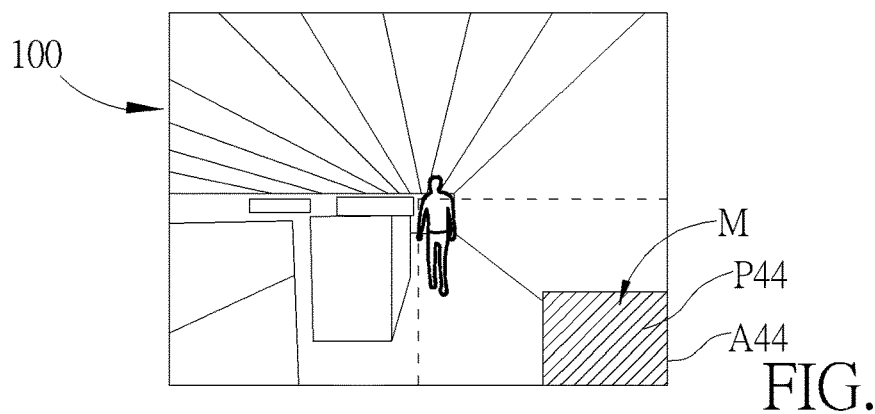

Regarding FIG. 6 to FIG. 9, since the mask M covers the object OBJ most when the mask M covers the portion A4 as shown in FIG. 9, the probability P4 can be lower than the probabilities P1 to P3. The portion A4 can thus be selected, and it can be determined that the location of object OBJ is more related to the portion A4. For example, the location of object OBJ is in the portion A4, or the ratio of the object OBJ in the portion A4 is more than that in each of the portions A1 to A3.

If it is sufficient to determine that the object OBJ is more related to the portion A4, the process can be stopped. However, if a higher resolution is pursued, the portion A4 can be partially covered to further analyze the location of the object OBJ. FIG. 10 to FIG. 13 illustrate the mask M being moved to sequentially cover sub-portions A41, A42, A43 and A44 in the selected portion A4 to more precisely detect the location of the object OBJ.

The operation related to FIG. 10 to FIG. 13 can be similar to the operation of FIG. 6 to FIG. 9. The portion A4 can be regarded an image to be analyzed, and the four sub-portions A41, A42, A43 and A44 can be covered in sequence to respectively calculate the probabilities P41, P42, P43 and P44. The probabilities P41, P42, P43 and P44 can be respectively remarked to the sub-portions A41, A42, A43 and A44 to further detect the location of the object OBJ being more related to which sub-portion(s) in the selected portion (e.g. A4). Hence, the resolution of detecting the object OBJ can be improved. In the example of FIG. 10 to FIG. 13, the sub-portion A41 can be selected since the probability P41 is relatively low, and the location of the object OBJ can be more related to the sub-portion A41.

By means of selecting at least one portion (e.g., A4) and further covering sub-portions of the selected portion to detect the location of the object OBJ, the computing resources can be saved. For example, regarding FIG. 6 to FIG. 9, since the location of the object OBJ is more related to the portion A4, the portions A1 to A3 can be optionally omitted without being further analyzed. Hence, the operation of the example shown in FIG. 6 to FIG. 13 can save more resources than that of FIG. 1.

The monitor method provided by embodiments can also reduce the use of weights of a neural network model. In FIG. 1 and FIG. 3 to FIG. 13, the mask M is used to cover a portion or a sub-portion of the image 100, and a neural network model can be used to analyze the covered image to calculate probability of the object OBJ existing in the image 100. The location and/or the dimension of the mask M can be adjusted; however, the neural network model (e.g., CNN model) used for calculation and classification in each stage can be similar or even the same. In other words, the same set of weights used for calculating different probabilities. Hence, the computing resources can be further reduced.

When the mask M is of a predetermined dimension corresponding to a predetermined resolution, a sub-portion may not be partially covered to analyze the location of the object OBJ. If a higher resolution is needed, as the operation shown in FIG. 10 to FIG. 13, a selected sub-portion can be further partially covered by the mask M (with a further reduced dimension) to calculate corresponding probabilities of the object OBJ existing in order to further analyze the location of the object OBJ in the selected sub-portion.

The operations described in FIG. 1, FIG. 4, FIG. 5 to FIG. 13 can be optionally applied in combination to analyze an image. For example, the operations described in FIG. 1, FIG. 4 and FIG. 5 can be used to analyze an image to detect an object.

Figure 14:
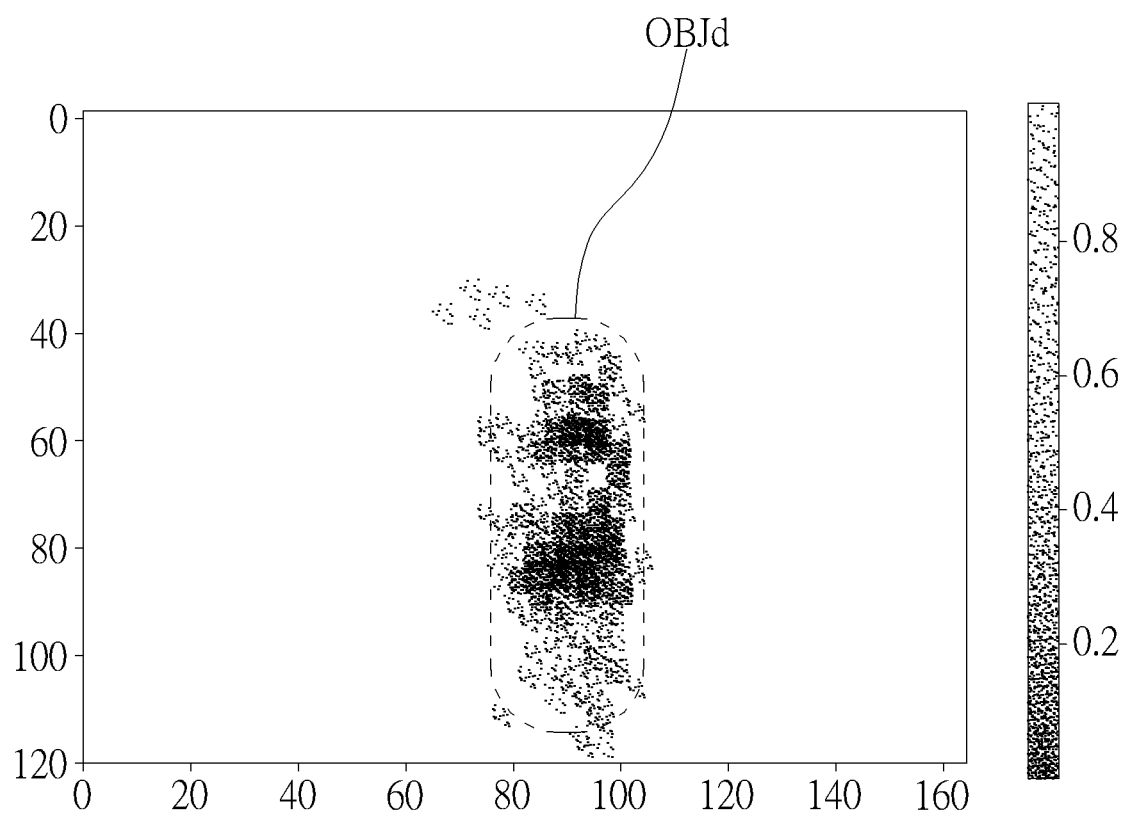
FIG. 14 illustrates the processed image generated by processing the image shown in FIG. 6 to FIG. 13.

FIG. 14 illustrates the processed image 110 generated by processing the image 100 shown in FIG. 6 to FIG. 13. The unit used on the vertical and horizontal axes of FIG. 14 can be pixel or unit of length. The density shown in FIG. 14 can be corresponding to the probability of the object OBJ existing in the image 100, and the probability can be normalized if required. As described in FIG. 1 to FIG. 13, the mask M can slide to cover a plurality of portions (and sub-portions) to calculate a plurality of probabilities, and the probabilities can be remarked in the processed image 110.

As shown in FIG. 14, the location of the objected OBJ can be observed as the pattern OBJd; though the boundary of the pattern OBJd may not be very clear, it may be sufficient for the purpose of security surveillance. If a higher resolution is needed, the mask M mentioned above can be further shrunk in size and shifted by a smaller distance each time to more accurately locate the object OBJ. The pattern OBJd can be displayed for a user to watch, or not be displayed to be merely recognized by a machine.

Figure 15:
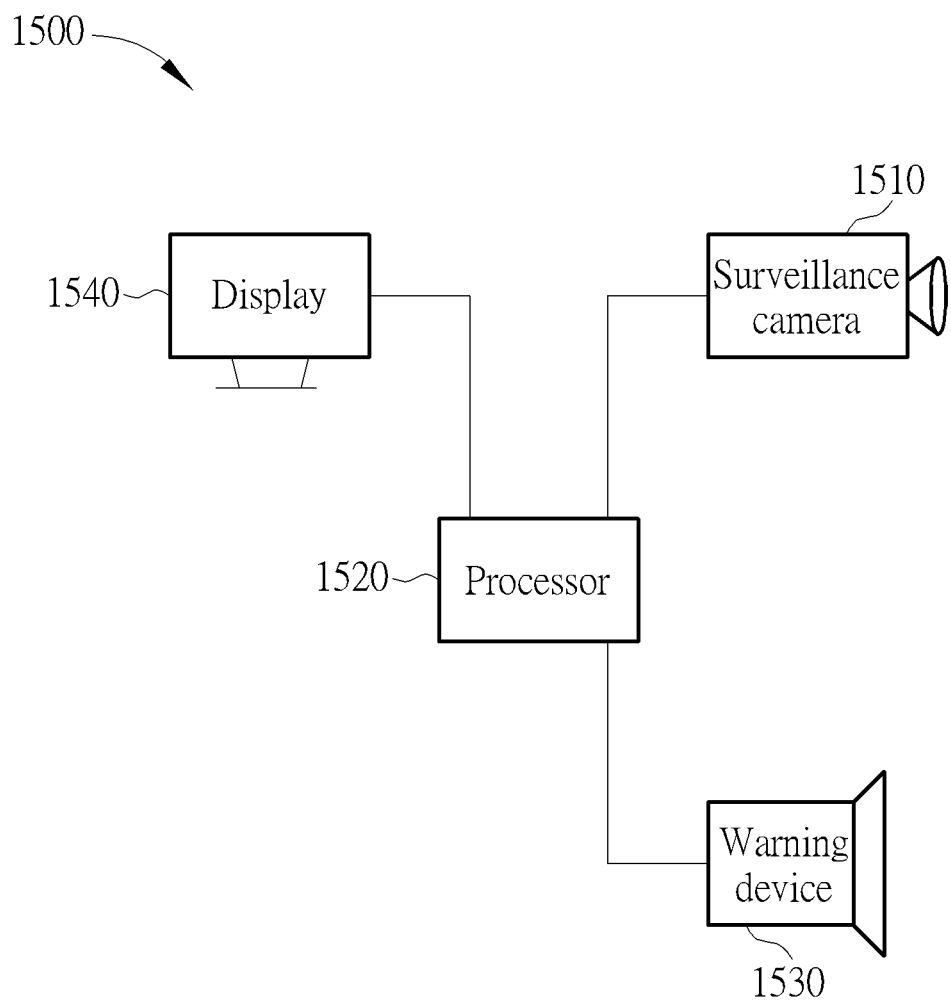
FIG. 15 illustrates a monitor system for detecting an object according to embodiments.

FIG. 15 illustrates a monitor system 1500 for detecting an object OBJ according to embodiments. The monitor system 1500 can include a surveillance camera 1510, a warning device 1530, a display 1540 and a processor 1520 coupled to the surveillance camera 1510, the warning device 1530 and the display 1540. The surveillance camera 1510 can capture the image 100 mentioned above. The surveillance camera 1510 can be an optical camera, an infrared camera and/or a network Internet Protocol camera. The processor 1520 can used to perform the method 200 and related operations, determinations and classifications mentioned above. The display 1540 can selectively display the image 100, the processed image 120, the mask M in each stage, the data, the process and/or the result related to detection and analysis of the location of the object OBJ. The warning device 1530 can send a warning signal when the object OBJ is detected and/or the object OBJ is detected to be in a predetermined area. The warning signal can include warning sound, warning light or a notification to the police or the security guard.

In summary, by means of the monitor method and the monitor system provided by embodiments, an automatic solution can be provided to detect the existence and the location of an object. The correctness can be assured, the resolution of detection can be flexibly adjusted and the computing resource can be saved. Hence, the long-standing problem in the field can be effectively dealt with.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A monitor method for detecting an object, comprising:
capturing an image;
calculating an initial probability of the object existing in the image;
applying a mask to cover a first portion of the image if the initial probability is higher than a threshold;
calculating a first probability of the object existing in the image excluding the first portion;
applying the mask to cover a second portion of the image;
calculating a second probability of the object existing in the image excluding the second portion; and
using at least the first probability and the second probability to determine a location of the object in the image;
wherein the location of the object in the image is determined if the first probability and/or the second probability is lower than the threshold.

2. The monitor method of claim 1, further comprising:
determining the object does not exist in the image if the initial probability is lower than the threshold.

3. The monitor method of claim 1, wherein the first portion partially overlaps with the second portion.

4. The monitor method of claim 1, wherein a dimension of the mask is adjusted so that a dimension of the first portion is different from a dimension of the second portion.

5. The monitor method of claim 1, wherein the first probability and the second probability are calculated using a same set of weights of a neural network model.

6. The monitor method of claim 1, further comprising:
sending a warning when the object is detected and/or the object is detected to be in a predetermined area.

7. The monitor method of claim 1, further comprising:
determine whether a location of the mask is at a predetermined location;
wherein the mask is not moved to cover a subsequent portion of the image when the mask is at the predetermined location.

8. The monitor method of claim 1, wherein the first portion does not overlap with the second portion.

9. The monitor method of claim 1, wherein one of the first portion and the second portion is inside another one of the first portion and the second portion.

10. The monitor method of claim 1, wherein using at least the first probability and the second probability to detect the location of the object in the image, comprises:
selecting a lower probability of the first probability and the second probability wherein the lower probability is corresponding to a selected portion of the first portion and the second portion;
determining the location of the object is more related to the selected portion.

11. The monitor method of claim 1, further comprising:
selecting a selected portion from the first portion and the second portion according to at least the first probability and the second probability;
applying the mask to cover a first sub-portion of the selected portion wherein the mask is shrunk; and
calculating a third probability of the object existing in the image excluding the first sub-portion;
wherein the location of the object in the image is detected according to at least the third probability.

12. The monitor method of claim 11, further comprising:
applying the mask to cover a second sub-portion of the selected portion; and
calculating a fourth probability of the object existing in the image excluding the second sub-portion;
wherein the location of the object in the image is detected according to at least the third probability and the fourth probability.

13. The monitor method of claim 11, wherein the first probability and the third probability are calculated using a same set of weights of a neural network model.

14. A monitor system for detecting an object, comprising:
a surveillance camera configured to capture an image; and
a processor configured to calculate an initial probability of the object existing in the image, apply a mask to cover a first portion of the image if the initial probability is higher than a threshold, calculate a first probability of the object existing in the image excluding the first portion, apply the mask to cover a second portion of the image, calculate a second probability of the object existing in the image excluding the second portion, and use at least the first probability and the second probability to determine a location of the object in the image;
wherein the location of the object in the image is determined by the processor if the first probability and/or the second probability is lower than the threshold.

15. The monitor system of claim 14, further comprising a display configured to display the image and selectively display the mask.

16. The monitor system of claim 14, further comprising a warning device configured to send a warning when the object is detected and/or the object is detected to be in a predetermined area.

17. The monitor system of claim 14, wherein the processor is further configured to use a same set of weights in a neural network model for calculating the first probability and the second probability.

* * * * *